(No Model.)
H. MELTZER.
BALL BEARING.
No. 599,621. Patented Feb. 22, 1898.
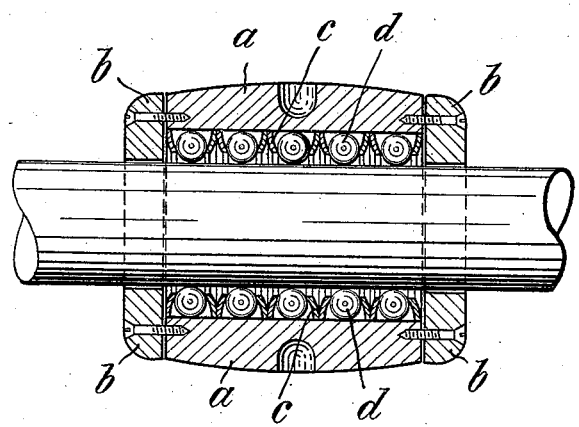
WITNESSES
INVENTOR:
H. Meltzer
BY
ATTORNEYS.

UNITED STATES PATENT OFFICE.

HEINRICH MELTZER, OF RATIBOR, GERMANY.

BALL-BEARING.

SPECIFICATION forming part of Letters Patent No. 599,621, dated February 22, 1898.

Application filed April 8, 1897. Serial No. 631,230. (No model.)

*To all whom it may concern:*

Be it known that I, HEINRICH MELTZER, a subject of the King of Prussia, Emperor of Germany, residing at Ratibor, in the Kingdom of Prussia, Germany, have invented new and useful Improvements in Ball-Bearings, of which the following is a specification.

This invention relates to an improved construction of ball-bearings for shafts, &c. Ball-bearings of present construction suffer from the disadvantage that if one of the balls breaks the entire bearing is rendered unserviceable, as the balls jam and abrade both the bearing-box and the shaft. According to my present invention I entirely obviate this defect by preventing the balls from coming in contact with each other in the longitudinal direction of the shaft, being separated from each other by the provision of intermediate rings having spring action, which rings, however, permit of a certain lateral shifting of the balls, sufficient for enabling them to avoid obstructions that may lie in their path.

The accompanying drawing is a longitudinal section of my improved ball-bearing.

The bearing may for the purposes of this invention (which is mainly applicable to small shafting) be constructed in various ways. According to one construction it consists of a cast-iron cylindrical box $a$, case-hardened and ground inside and having an internal diameter as much larger than that of the shafting as is determined by the size of the balls to be used, the end of the annular space thus formed between the two being closed by annular removable covers $b$ $b$. Into the annular space are introduced rings $c$, of thin elastic metal, dished so as to have a curved cross-section and to be capable of lateral spring action. Between each two of these rings $c$, placed so as to present their concave sides toward each other, are introduced series of balls $d$. The rings $c$ are of such form as to fit with their peripheries close against the inner surface of the cylindrical bearing-box, while their inner edges extend slightly beyond the diameters of the balls. These are always held between the rings whether they are in contact with the shaft or not. At the same time the rings only bear with their inner edges with slight spring action against the sides of the balls, so that these can revolve freely on the shaft while guided by the rings.

The shaft is preferably either case-hardened at the bearing or a hardened sleeve is fitted thereon at that point.

I claim—

A bearing having a box through which a shaft may extend, a series of resilient rings inclosed by the inner wall of said box and running around said wall parallel with each other, the rings being arranged in pairs and being of uniform thickness and bent slightly toward each other, those of the rings in contact curving away from each other at their inner portions, and a series of balls held between each pair of rings by the inward inclination of the members of said pairs, the resilient rings serving to hold the balls normally in line and to permit lateral deviation of the balls when the balls are subjected to lateral strain.

In testimony whereof I have signed my name to this specification in the presence of two subscribing witnesses.

HEINRICH MELTZER.

Witnesses:
 EDUARD PEITZ,
 G. HÜLSMANN.